(12) United States Patent
Kim et al.

(10) Patent No.: US 7,592,609 B2
(45) Date of Patent: Sep. 22, 2009

(54) THERMOLUMINESCENT DOSIMETER FOR RADIATION MONITORING, COMPRISING LIF DOPED WITH MG, CU, AND SI, AND FABRICATION METHOD THEREOF

(75) Inventors: Jang-Lyul Kim, Deajeon (KR); Jung-Il Lee, Deajeon (KR); Jeong-Sun Yang, Jeju (KR); Bong-Hwan Kim, Deajeon (KR); Jong-Soo Kim, Deajeon (KR)

(73) Assignees: Korea Atomic Energy Research Institute, Daejeon-si (KR); Korea Hydro & Nuclear Power Co. Ltd., Seoul (KR)

( * ) Notice: Subject to any disclaimer, the term of this patent is extended or adjusted under 35 U.S.C. 154(b) by 149 days.

(21) Appl. No.: 11/789,916

(22) Filed: Apr. 26, 2007

(65) Prior Publication Data

US 2008/0142731 A1   Jun. 19, 2008

(30) Foreign Application Priority Data

Aug. 10, 2006   (KR) ...................... 10-2006-0075535

(51) Int. Cl.
*H05B 33/00* (2006.01)
*G01T 1/10* (2006.01)

(52) U.S. Cl. ................. 250/484.5; 250/337; 250/484.3; 250/484.4; 252/301.4 R; 252/301.4 H (58) Field of Classification Search ................. 250/337, 250/484.3–484.5; 252/301.4 R, 301.4 H; 476/179.5
See application file for complete search history.

(56) References Cited

U.S. PATENT DOCUMENTS 4,129,519 A * 12/1978 Matsuzawa .......... 252/301.4 H 5,622,659 A * 4/1997 Spicuzza ...................... 264/21
2003/0157005 A1 * 8/2003 Kim et al. ................ 423/179.5

OTHER PUBLICATIONS

Borchi, E., M. Bruzzi, C. Furetta. "Deconvolution of BaSO4:Eu TL Glow-Curve." IEEE Transactions on Nuclear Science 38, 2: 877-82.*

(Continued)

*Primary Examiner*—David P Porta
*Assistant Examiner*—Casey Bryant
(74) *Attorney, Agent, or Firm*—Lucas & Mercanti, LLP (57) ABSTRACT

Disclosed herein are a thermoluminescent dosimeter for radiation monitoring, comprising LiF doped with Mg, Cu and Si, and a fabrication method thereof. The LiF:Mg,Cu,Si thermoluminescent dosimeter is fabricated by heating a LiF-based thermoluminescent powder material having a composition of LiF mother material, 0.1-0.5 mol % of a Mg compound, 0.001-0.05 mol % of a Cu compound and 0.5-1.3 mol % of a Si compound to a temperature of 900-1200° C. to melt the LiF-based material, cooling the melted material, compression-molding the cooled material, sintering the molded material, cooling the sintered material, and then annealing the cooled material. The thermoluminescent dosimeter has high thermal stability and thus maintains constant thermoluminescence sensitivity even when it is annealed at a high temperature of more than 240° C. Moreover, it has a remarkably low residual signal, and shows excellent dosimetric characteristics, because it can maintain the same sensitivity as its initial readout value, even when it is reused.

7 Claims, 4 Drawing Sheets

OTHER PUBLICATIONS

The International Commission on Radiological Protection by Pergamon Press, 1990 Recommendations of the International Commission on Radiologibal Protection.
J. I. Lee, et al., Developments in the Synthesis of LiF . . . , Radiation Protection Dosimetry, vol. 108, No. 1, pp. 79-83.

S.W.S. McKeever, et al., Thermoluminescence Dosimetry Materials: Properties and Uses, Nuclear Technology Publishing.
Toshiyuki Nakajima, et al., Development of a New Highly Sensitive LiF Thermoluminescence . . . , Nuclear Instruments and Methods, vol. 157, pp. 155-162, 1978.

* cited by examiner

THERMOLUMINESCENT DOSIMETER FOR RADIATION MONITORING, COMPRISING LIF DOPED WITH MG, CU, AND SI, AND FABRICATION METHOD THEREOF

CROSS-REFERENCE TO RELATED APPLICATION

This application claims the benefit of Korean Patent Application No. 10-2006-075535, filed Aug. 10, 2006 in the Korean Intellectual Property Office, the disclosure of which is incorporated herein in its entirety by reference.

BACKGROUND OF THE INVENTION

1. Field of the Invention

The present invention relates to a thermoluminescent dosimeter for radiation monitoring, comprising LiF doped with Mg, Cu and Si, and a fabrication method thereof. Particularly, the present invention relates to a thermoluminescent dosimeter that shows high thermal stability and thus maintains constant sensitivity even upon high-temperature annealing, has a remarkably low residual signal, and can maintain the same sensitivity as its initial readout value even when it is reused.

2. Description of the Prior Art

Various types of thermoluminescent detectors for detecting radiation employ various principles in various application fields. Examples thereof include: gas-filled counters, employing the principle of ionizing gas molecules by radiation; semiconductor detectors, employing the principle by which a semiconductor material produces electron-hole pairs upon exposure to radiation; scintillation counters, employing a material that generates scintillation upon exposure to radiation; film badges, employing the response of photographic films to radiation; and thermoluminescence dosimeters (hereinafter, "TLD"), employing the principle by which a material, such as an insulator, emits light when thermally stimulated after it is irradiated.

Among these radiation detectors, the TLD is a radiation detector which is widely used to measure personal exposures to radiation. In the thermoluminescence process, when an insulator or ionic crystal/crystalline material (solids) is irradiated with radiation (X and gamma rays, beta rays or alpha particles), electrons in the valence band are excited to reach the conduction band a large portion of these electrons will return to the valence band in a very short time, but some of them get located in a trapping energy levels (traps) within the forbidden band (valence band and conduction band are separated by fornidden band) due to the defects in the crystals. When electrons in the trapping level have no thermal disturbance, they may remain in these traps for a considerably long period of time. The number of trapped electrons is dependent upon the amount of ionizing radiation encountered by the solid.

However, when heat energy such as heating is applied to the irradiated solid from an external source, electrons no longer remain in the trapping level and move to the conduction band and recombine with holes at the recombination centre in the forbidden band to emit light of energy corresponding to the dexcitation energy of the recombination. The emission of the light is usually proportional to the amount of radiation dose, and thus can be used to determine the dose of radiation. Herein, the emitted light is used to measure personal exposures of radiation workers or doses encountered in the radiodiagnosis and delivered during radiation therapy treatment of patients.

The performance of thermoluminescent dosimeters comprising thermoluminescent materials depends on the thermoluminescent properties. In order for the thermoluminescent dosimeters to have excellent performance, the dosimeters should have high sensitivity to measure radiation as low as possible and should show an optimal structure of thermally stimulated luminescence glow curves.

According to ICRP 60 [ICRP, 1990 Recommendations of the International Commission on Radiological Protection, ICRP Publication 60, Pergamon Press, Oxford, N.Y., 1990], radiation levels to be encountered by radiation workers should be as low as reasonably achievable (ALARA) and to measure low levels of radiation. thermoluminescent materials showing high sensitivity to even low doses are required.

Also, the thermally stimulated luminescence glow curve indicates luminescence intensity at different temperatures of thermal stimulation and helps in deciding the heating profile required to obtain a signal. Specifically, the area of the luminescence glow curve indicates the emission of light, which is proportional to the dose of radiation. Thus the area of the luminescence curve which is a standard mode for dose assessment is used as a signal for arriving at final doses through dose assessment algorisms including calibrations and various correction factors.

In thermoluminescence phenomena, some of the electrons produced by ionizing radiation remain trapped in the trapping level, and emit light when they receive thermal energy. Thus, electrons in shallow traps corresponding to luminescence peaks formed in a low-temperature range can be excited, even by thermal stimulation at room temperature alone without any external heating, and this phenomenon of exciting electrons at room temperature increases as the temperature of the luminescent glow peaks decreases. Accordingly, the TL from the low-temperature peaks causes some loss of the information on the passage of time at room temperature, after the thermoluminescent material is irradiated with radiation, thus reducing the reliability of assessment of cumulative exposure dose, which could be a the major advantage of TLD if the lower temperature peaks are dominant.

Therefore, in a preferred structure of thermally stimulated luminescence glow curves of thermoluminescent material, the main luminescence peaks formed in a high-temperature range should be intense and the luminescence peaks in a low-temperature range should be absent or negilible. Preferably the main peaks should be in the form of single peak having a simple structure with no peaks on either the lower temperature side or the higher temperature side of the main glow peak. The glow peaks at higher temperature side of the main peak necessitates heating to higher temperatures which affects the signal to nose ratio due to the enhanced incandescence light at higher temperatures and the trap distribution to cause a change in the sensitivity for the reuse of the TLD. The presence of the higher temperature peaks in the close vicinity of the main peaks, if not erased, result in higher residual signal which also affects the reusability.

Recently, studies have been actively conducted to develop thermoluminescent materials, which have high sensitivity even at sufficiently low radiation doses, and show thermally stimulated luminescence glow curves having single main peaks with a simple structure.

In the above-described thermoluminescence phenomena, the structure of thermally stimulated luminescence glow curves greatly changes according to the state of the trapping level in the forbidden band and depends on the kind and the concentration of dopants added and also on the type of thermal treatment in the synthesis of crystalline structure. Thus, in order to obtain the most preferred thermoluminescent material, it is required to find the right kind of dopants to be added and the optimal concentrations of dopants and the preparation procedure thereof.

These days, in the USA, China, Poland, France and the like, LiF thermoluminescent materials are actively being studied, and developed in the form of powder- or solid-type dosimeters depending on the intended use thereof.

The LiF-based thermoluminescent (TL) materials are widely used in the radiation dosimetry field, because they have various advantages in that they show low photon energy dependence in their responses and are near tissue-equivalent materials, meaning that their responses to photon radiation is similar to that of human tissue.

Particularly, LiF:Mg,Cu,P material consisting of LiF doped with Mg, Cu and P as activators was introduced first in the year 1978, and was commercialized in the middle of the 1980s as GR-200 in China and as MCP-N in Poland. This material has radiation sensitivity about 30 times as high as that of the previously widely used LiF:Mg,Ti material, and has recently received the most attention in the radiation dosimetry field.

However, this material has two major disadvantages in that it shows a rapid reduction in sensitivity when annealed at a temperature higher than 240° C., and in that it has a relatively high residual signal. The residual signal of the TL material is defined as the ratio of the second readout value to the first readout value and acts as an important obstacle when the TL dosimeter is repeatedly used. Recently, the Korea Atomic Energy Research Institute has conducted research to overcome such disadvantages, and, as a result, has developed a LiF:Mg,Cu,Na,Si material. This material was assessed for the residual signal, but did not show a great difference in residual signal compared to the prior material.

SUMMARY OF THE INVENTION

Accordingly, it is an object of the present invention to provide a thermoluminescent dosimeter comprising LiF doped with Mg, Cu and Si, which has excellent densimetric characteristics and a low residual signal, has reduced thermoluminescent (TL) intensity in a higher temperature range of the main glow peak, leading to a residual signal markedly lower than that of the prior thermoluminescent dosimeter, and high thermal stability, and can maintain the same sensitivity as its initial readout value when it is reused.

To achieve the above object, the present invention provides a thermoluminescent dosimeter, comprising LiF doped with Mg, Cu and Si, the thermoluminescent dosimeter being fabricated by heating a LiF-based thermoluminescent powder material having a composition of a LiF mother material, 0.1-0.5 mol % of an Mg compound, 0.001-0.05 mol % of a Cu compound and 0.5-1.3 mol % of an Si compound to a temperature of 900-1200° C. to melt the LiF-based material, cooling the melted material, compression-molding the cooled material, sintering the molded material, cooling the sintered material, and then annealing the cooled material.

In another aspect, the present invention provides a method for fabricating a thermoluminescent dosimeter, comprising LiF doped with Mg, Cu and Si, the method comprising the steps of: (A) heating a LiF-based thermoluminescent powder material having a composition of a LiF mother material, 0.1-0.5 mol % of an Mg compound, 0.001-0.05 mol % of a Cu compound and 0.5-1.3 mol % of a Si compound to a temperature of 900-1200° C. to melt the LiF-based material; (B) cooling the melted material obtained in the step (A) and compression-molding the cooled material; (C) sintering the compression-molded material at a temperature of 760-840° C. in an inert gas atmosphere; (D) subjecting the sintered material to a first-step annealing process at a temperature of 285-305° C., followed by cooling; and (E) subjecting the annealed material obtained in the step (D) to a second-step annealing process at a temperature of 255-265° C., followed by cooling.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE INVENTION

Hereinafter, the present invention will be described in detail.

The present invention comprises a thermoluminescent dosimeter for radiation monitoring.

Specifically, the present invention comprises a thermoluminescent dosimeter, containing LiF doped with Mg, Cu and Si, the dosimeter being fabricated by heating a LiF-based thermoluminescent powder material having a composition of LiF mother material, 0.1-0.5 mol % of a Mg compound, 0.001-0.05 mol % of a Cu compound and 0.5-1.3 mol % of an Si compound to a temperature of 900-1200° C. to melt the LiF-based material, cooling the melted material, compression-molding the cooled material, sintering the molded material, cooling the sintered material, and then annealing the cooled material.

In thermoluminescent dosimeters for radiation monitoring, the luminescent intensity and the structure of luminescent glow curves are determined depending on the state of the trapping center and the recombination center in the forbidden band. Because the state of these is influenced mainly by the kind and concentration of dopants (i.e., activators) added, the kind and concentration of the activators become major factors that determine the luminescent intensity and dosimetric characteristics of a final dosimeter.

Accordingly, the present invention relates to a composition comprising a LiF mother material, 0.1-0.5 mol % of an Mg compound, 0.001-0.05 mol % of a Cu compound and 0.5-1.3 mol % of an Si compound, and more preferably a composition comprising a LiF mother material, 0.45 mol % of an Mg compound, 0.025 mol % of a Cu compound and 0.9 mol % of an Si compound.

The inventive LiF-based thermoluminescent dosimeter for radiation monitoring is prepared by adding the Mg compound, Cu compound and Si compound to LiF. In this respect, as the compounds added, any compounds can be used as long as they are ionic in nature.

As used herein, the term "Mg compound", as the activator added to LiF, refers to an Mg-containing ionic material that can provide Mg. Examples thereof include magnesium sulfate, magnesium chloride, magnesium fluoride, and magnesium oxide. Magnesium sulfate is preferably used.

As used herein, the term "Cu compound" as the activator added to LiF refers to a Cu-containing ionic material that can provide Cu. Examples thereof include copper sulfate, copper nitrate, copper oxide, and copper chloride. Copper sulfate is preferably used.

As used herein, the term "Si compound" as the activator added to LiF refers to Si-containing ionic material that can provide Si. Examples thereof include $SiO_2$ and $SiCl_4$. $SiO_2$ is preferably used.

Also, the present invention comprises a method for fabricating said thermoluminescent dosimeter.

Specifically, the present invention provides a method for fabricating a thermoluminescent dosimeter, comprising LiF doped with Mg, Cu and Si, the method comprising the steps of: (A) heating a LiF-based thermoluminescent powder material having a composition of a LiF mother material, 0.1-0.5 mol % of an Mg compound, 0.001-0.05 mol % of a Cu compound and 0.5-1.3 mol % of an Si compound, to a temperature of 900-1200° C., to melt the LiF-based material; (B) cooling the melted material obtained in the step (A) and compression-molding the cooled material; (C) sintering the compression-molded material at a temperature of 760-840° C. in an atmosphere of inert gas (e.g., nitrogen, argon, etc.); (D) subjecting the sintered material to a first-step annealing process at a temperature of 285-305° C., followed by cooling; and (E) subjecting the annealed material obtained in the step (D) to a second-step annealing process at a temperature of 255-265° C., followed by cooling.

The dosimetric characteristics of LiF-based TLD material greatly depend on the chemical composition of dopants added to the mother material, and on various parameters in a fabrication process. In order for the LiF material to have thermoluminescence phenomena suitable for use as a thermoluminescent dosimeter for radiation monitoring, electron trapping and recombination levels suitable should be formed. The electron trapping and recombination levels can be formed by adding dopants to the mother material and diffusing the dopants into the lattice of the mother material through a suitable process of fabrication. This process is referred to as an activation process, and the added dopants are referred to as activators.

The step (A) is an activation step and is carried out by adding, to the LiF mother material, 0.1-0.5 mol % of the Mg compound, 0.001-0.05 mol % of the Cu compound and 0.5-1.3 mol % of the Si compound, to prepare a LiF-based thermoluminescent powder material, melting the LiF-based material at a temperature of about 900-1200° C., which is higher than the melting point (847° C.) of LiF, to activate the LiF-based material, thus obtaining a crystal material, and cooling and grinding the crystal material.

The step (B) comprises a room temperature annealing step and a compression-molding step.

The room temperature annealing step is a process, which is conducted after the activation step and enables the LiF-based thermoluminescent powder material, a high-temperature crystal, to be cooled as fast as possible. The room temperature annealing process is carried out by cooling the material in air or rapidly refrigerating the material using a metal plate such as a frozen aluminum plate or a copper plate. Such a room temperature annealing process is also adopted in a cooling process in a subsequent thermal treatment step.

Subsequent to the room temperature annealing process, the crystal material is washed with a 1-5 N hydrochloric acid solution to remove impurities from the crystal material. Also, the crystal material is further washed with water to remove the hydrochloric acid solution. Then, the crystal material is treated with a volatile organic solvent to help rapidly cool the crystal surface. As the volatile organic solvent used in this respect, any conventional organic solvent can be used as long as it has a low boiling point and low viscosity. Acetone or ethanol is preferably used.

The thermoluminescent material is ground and then sieved through a standard sieve to select crystals having the desired grain size, and preferably a grain size of about 40-150 μm, thus obtaining a LiF-based powder material.

Meanwhile, the compression-molding step is a step for preparing the thermoluminescent powder material into a dosimeter shape for practical use. Methods for preparing the powder material into the dosimeter shape include a method of compressing the powder at a high temperature and cutting the compressed material into a specific shape, and a method of cold-compressing the powder and sintering the compressed material. It is preferable to use a method of cold-compressing the powder and sintering the compressed material in an electric furnace, the temperature and atmosphere of which are controlled.

The LiF-based thermoluminescent powder material can be changed into various sizes and shapes during preparation depending on the intended use thereof. For example, a mold can be used to form the powder material into the shape of rods, square chips, discs or pellets.

In an embodiment of the present invention, the ground crystal powder is placed in a mold having a diameter of 4.5 mm, in which it is formed into a disc shape having a diameter of 4.5 mm and a thickness of 0.8 mm by applying pressure of 7-13 tons using a press at room temperature.

The step (C) is a sintering process for obtaining a dosimeter from the above-obtained molded material, and is conducted to increase the mechanical strength of the dosimeter and, at the same time, to cause the dosimeter to have a thermally stimulated luminescence glow curve structure optimized for use as a TLD. Thus, the sintering step is carried out by sintering the molded material in an atmosphere of insert gas (e.g., nitrogen, argon, etc.) at a temperature of about 760-840° C., and preferably a temperature of about 810-835° C. The sintering time can be changed depending on the sintering temperature, and is generally about 10-20 minutes.

The annealing step, which is a final step in the method for fabricating the thermoluminescent dosimeter, is carried out in a dual-step annealing process.

The step (D) is a first-step annealing process, which is carried out at a temperature of about 285-305° C. Also, the annealing time can be changed depending on the annealing temperature, and is generally about 5-30 minutes. A cooling process following the first-step annealing process is conducted according to the room temperature annealing process described in the step (B).

The step (E) is a second-step annealing process which is carried out at a temperature of about 255-265° C. Also, the annealing time can be changed depending on the annealing temperature, and is generally about 5-30 minutes. A cooling process following the second-step annealing process is conducted according to the room temperature annealing process described in the step (B).

Figure 3:
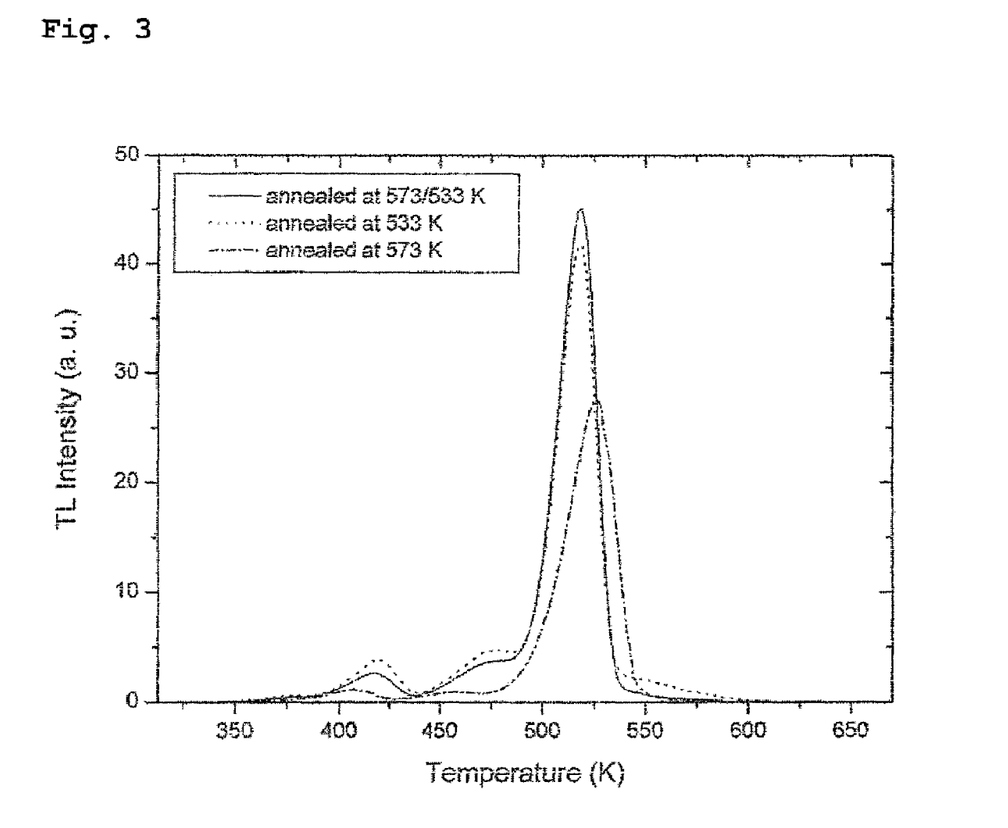
FIG. 3 is a graphic diagram showing the comparison between thermoluminescent dosimeters fabricated using different thermal treatment methods in Example of the present invention and Comparative Examples.

The dual-step annealing process is a process for allowing the added dopants to take more stable positions in the lattice of the mother material to improve the structure of thermoluminescence curves and, at the same time, to increase the time stability of the dosimeteric information. In fact, as shown in FIG. 3, the structure of luminescence glow curves of a sample subjected to the dual-step annealing process showed a marked increase in the intensity of main peak compared to that of a sample subjected to a single annealing process, and also showed a marked decrease in the intensity of high-temperature peaks causing a residual signal. Thus, it was confirmed that a dosimeter having a more preferred structure of thermally stimulated luminescence glow curves could be formed through the dual-step annealing process.

Hereinafter, the thermoluminescent dosimeter for radiation monitoring, comprising LiF doped with Mg, Cu and Si, according to the present invention, and the fabrication method thereof will be described with reference to examples and the accompanying drawing in order to provide a better understanding of the present invention. It is to be understood, however, that the examples and drawings are given to show the best preferred embodiment and drawings of the present invention, and the scope of the present invention is not limited thereto.

EXAMPLE 1

Fabrication of Thermoluminescent Element for Radiation Monitoring, Comprising LiF Doped with Mg, Cu and Si To 99.9% pure LiF, 0.45 mol % of $MgSO_4 \cdot 7H_2O$, 0.025 mol % of $CuSO_4 \cdot 5H_2O$, and 0.9 mol % of $SiO_2$ nanopowder were added as dopants. Then, the components were uniformly mixed in distilled water using a magnetic stirrer. The mixture was dried on a hot plate at 150° C. with the operation of a magnetic stirrer, after which it was placed in a platinum crucible and heated and melted in an electric furnace under an air atmosphere at 1050° C. for 30 minutes, thus activating the mixture. Then, the melted material was rapidly cooled on a previously prepared copper plate having a temperature of −20° C. The cooled material was ground, and sieved through a standard sieve to extract a crystal material having a grain size of 40-150 μm. The extracted crystal material was washed with HCl solution and then with distilled water, and treated with acetone, followed by drying. The powder material was compression-molded into a pellet shape having a diameter of 4.5 mm and a thickness of 0.8 mm. The compression-molded material was placed in a platinum crucible and sintered in an electric furnace under a nitrogen atmosphere at 825° C. for 10 minutes. The sintered material was rapidly cooled on a previously prepared copper plate having a temperature of −20° C. The cooled sintered material was annealed in an electric furnace at 300° C. for 10 minutes and rapidly cooled to room temperature. Then, the cooled material was annealed at 260° C. for 10 minutes and rapidly cooled to room temperature, thus fabricating a pellet-type thermoluminescent dosimeter comprising LiF doped with Mg, Cu and Si.

COMPARATIVE EXAMPLE 1

Thermoluminescent Dosimeter (GR-200A) for Radiation Monitoring, Comprising LiF Doped with Mg, Cu and P A LiF:Mg,Cu,P thermoluminescent element (GR-200A) comprising LiF doped with Mg, Cu and P as activators (Nakajima, T., Murayama, Y., Matsuzawa, T. and Koyano, A., *Development of a New Highly Sensitive LiF Thermoluminescent Dosimeter and its Applications*. Nucl. Instrum. Methods 157, 155-162 (1978)) was obtained from Conqueror Electronics Technology Co., Ltd., China.

COMPARATIVE EXAMPLE 2

Thermoluminescent Dosimeter (TLD-100) for Radiation Monitoring, Comprising LiF Doped with Mg and Ti A LiF:Mg,Ti thermoluminescent dosimeter (TLD-100) comprising LiF doped with Mg and Ti as activators (S. W. S. McKeever, M. Moscovitch, and P. D. Townsend, Fluorides, in *Thermoluminescence Dosimetry Materials: Properties and Uses* (Nuclear Technology Publishing, Ashford, UK, 1995), Chap. 3, p. 45.) was obtained from Harshaw Chemical Co., USA.

COMPARATIVE EXAMPLE 3

Thermoluminescent Dosimeter (KLT-300) for Radiation Monitoring, comprising LiF Doped with Mg, Cu, Na and Si A LiF:Mg,Cu,Na,Si thermoluminescent dosimeter (KLT-300) comprising LiF doped with Mg, Cu, Na and Si (Lee, J. I., Kim, J. L., Chang, S. Y., Chung, K. S. and Choe, H. S. *Developments in the synthesis of LiF:Mg,Cu,Na,Si TL material*. Radiat. Prot. Dosim. 108, 79-83 (2004)) was obtained from the Korea Atomic Energy Research Institute (KAERI).

Assessment

1. Comparison of Thermally Stimulated Luminescence Curves 28 mg of each of 10 samples for each of the thermoluminescent dosimeters prepared in Example 1 and Comparative Examples was prepared. To obtain a glow curve as thermally stimulated luminescence intensity, each of the samples was irradiated to a dose of 20 mGy using a Cs-137 gamma-ray irradiator. The thermally stimulated luminescence of each sample was measured using a commercial TLD reader (Harshaw 4500, USA) under a nitrogen atmosphere at a heating rate of 10° C./sec from room temperature to 300° C.

Figure 1:
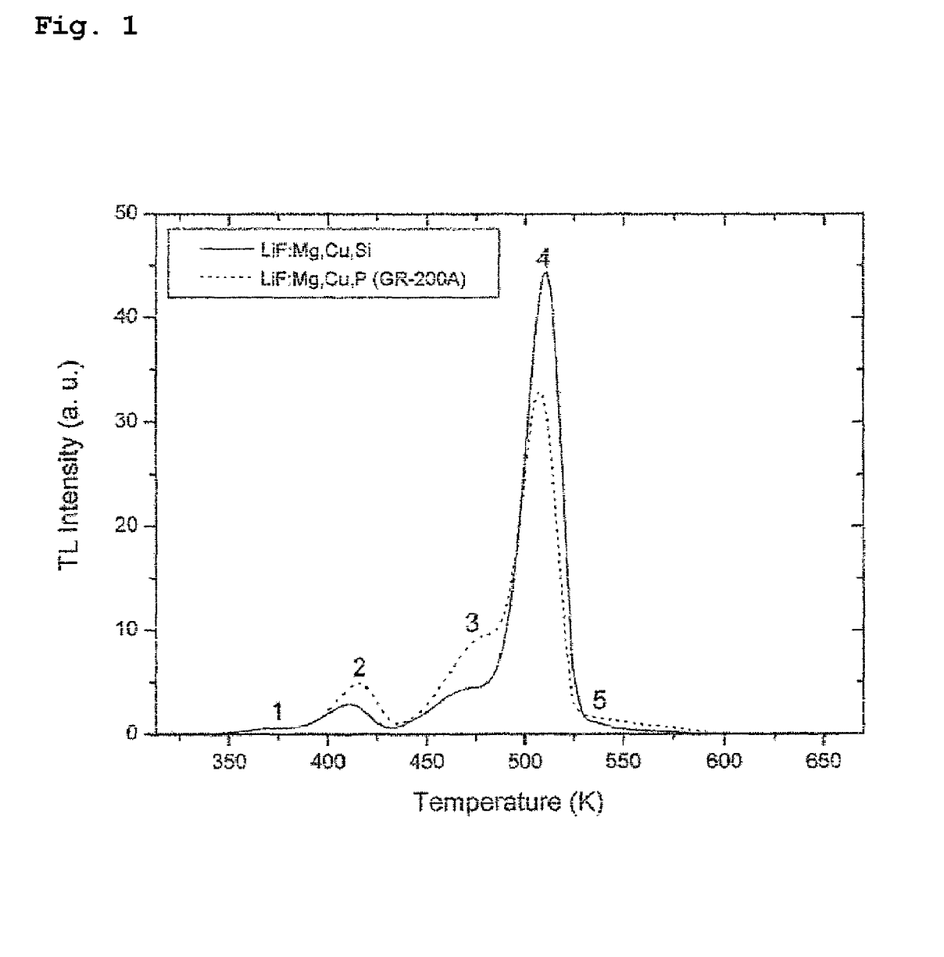
FIG. 1 is a graphic diagram showing the luminescence glow curves of thermoluminescent dosimeters according to Example of the present invention and Comparative Examples.

FIG. 1 shows the luminescence glow curves of the thermoluminescent dosimeters fabricated in Example 1 and Comparative Example 1. Referring to FIG. 1, the thermoluminescent intensity was concentrated between 303 K (30° C.) and 671 K (394° C.). As expected, Example 1 and Comparative Example 1 showed five peaks at 377 K (1), 411 K (2), 471 K (3), 511 K (4) and 539 K (5), and showed a main peak at 511 K. It could be seen that the glow curve patterns of the thermoluminescent dosimeters fabricated in Example 1 and Comparative Example 1 were similar to each other, the luminescence intensities at the peaks 1-3 and 5 were lower in the thermoluminescent dosimeter of Example 1 than in Comparative Example 1, and the intensity at the main peak (peak 4), indicating the sensitivity to radiation, was significantly higher in the thermoluminescent dosimeter of Example 1 than in Comparative Example 1. Also, the thermoluminescent intensity of Example 1 was 1.1 times and 55 times higher than those of Comparative Examples 1 and 2, respectively.

The reason why the residual signal in Comparative Example 1 was relatively high was that the maximum readout temperature for removing the peak 5 did not exceed 513 K (240° C.). One of the important conditions for reducing the residual signal of thermoluminescent dosimeter is the maximum readout temperature. The residual signal of thermoluminescent dosimeters is defined as the ratio of the second readout value to the first readout value for information on the radiation dose of thermoluminescent materials under the same conditions. The peak 5 cannot be completely removed merely by heating the dosimeter to 513 K.

2. Thermal Stability

Figure 2:
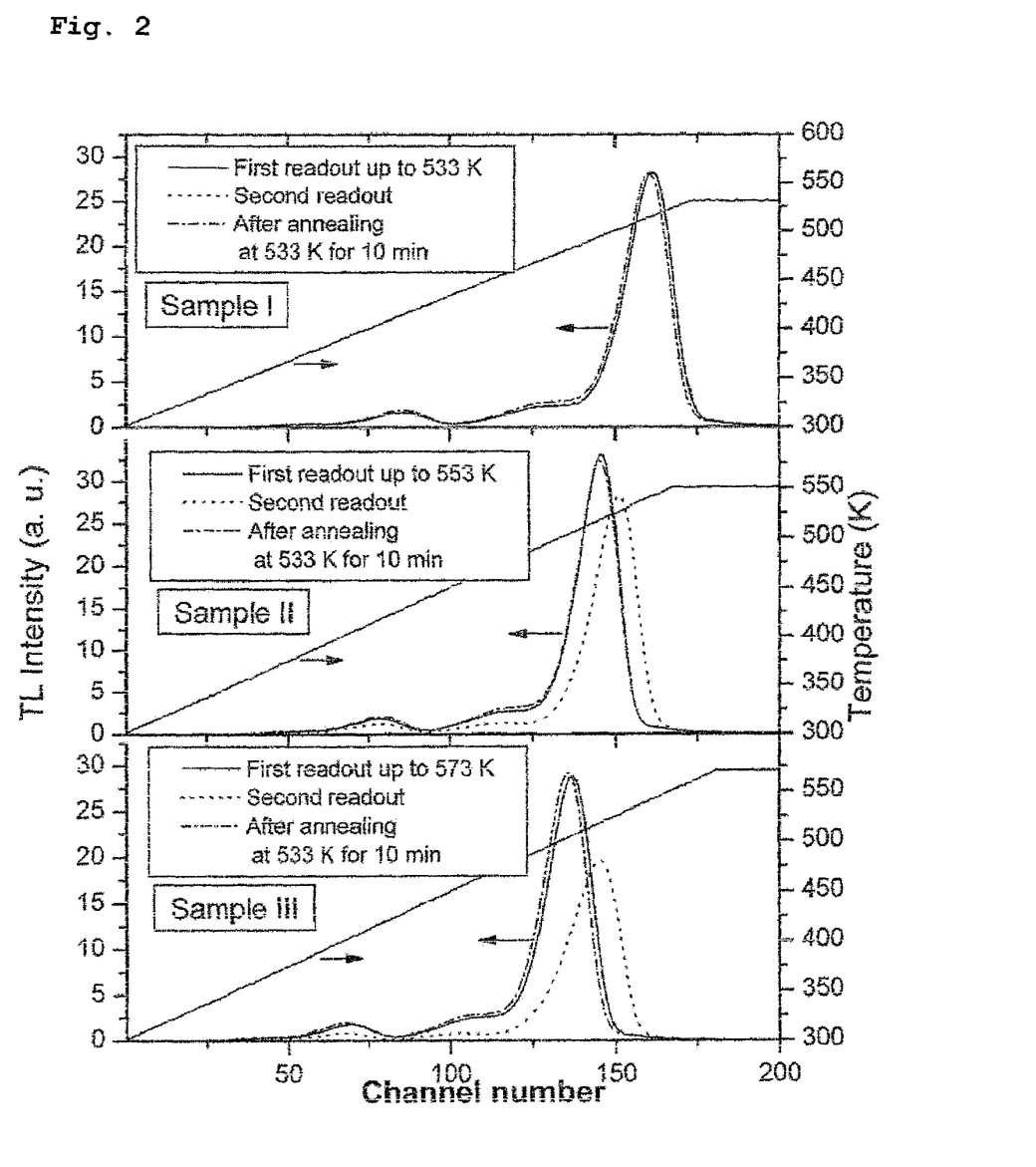
FIG. 2 is a graphic diagram showing thermally stimulated luminescence glow curves obtained by measuring thermoluminescent intensity at the different maximum readout temperatures after the irradiation of samples according to Examples of the present invention.

FIG. 2 shows thermally stimulated luminescence glow curves obtained by measuring the thermoluminescence intensity at the maximum readout temperatures, measured after irradiating the three samples of Example with a dose of 20 mGy, that is, 533 K (260° C.) for sample I, 553 K (280° C.) for sample II and 573 K (300° C.) for sample III. After information on the first dose was readout, the samples were irradiated with gamma rays, and readout again at the same maximum readout temperature. Finally, these samples were annealed at 553 K (280° C.) for 10 minutes, and then readout at the respective maximum temperatures.

Referring to FIG. 2, it could be seen that, except for sample I, the thermoluminescent intensity was markedly decreased with an increase in the maximum readout temperature. It was noticeable that, when the sample was annealed at 533 K for 10 minutes, the thermoluminescent intensity and the structure of luminescence glow curves were completely restored. Accordingly, it could be seen that the thermoluminescent dosimeter could be read up to 573 K by using the dual-step annealing process described in Example 1 without causing a reduction in luminescent intensity or a change in the structure of luminescence glow curves.

Table 1 below shows the comparison of the residual signals of the LiF-based thermoluminescent dosimeters fabricated in Example 1 and Comparative Example 1.

TABLE 1

|  | Example 1 | Comparative Example 1 (China) | Comparative Example 2 (USA) | Comparative Example 3 (Korea) |
|---|---|---|---|---|
| Maximum readout temperature (° C.) | 300 | 240 | 245 | 260 |
| Residual signal (%) | 0.025 | 0.92 | 0.15 | 0.20 |

As can be seen in Table 1, the LiF:Mg,Cu,Si dosimeter according to Example 1 of the present invention had a very low residual signal of 0.025%. This became possible by greatly reducing the intensity of high-temperature peak (peak 5) and increasing the maximum readout temperature to 573 K (300° C.).

With respect to luminescence intensity, the intensities of the thermoluminescent dosimeter according to Example 1 and Comparative Example 1 were about 55.2 times and 49.9 times higher than that of Comparative Example 2 (TLD-100), respectively. When the thermoluminescent dosimeters according to Comparative Examples 1-3 were heated to more than 240° C., the sensitivity thereof was reduced, such that the dosimeters could not be reused while maintaining the same sensitivity as the initial sensitivity. On the other hand, the thermoluminescent dosimeter according to the present invention is advantageous in that it has excellent thermal stability, so it can maintain the same sensitivity as its initial sensitivity, and thus can be easily reused.

3. Effect of Dual-Step Annealing

FIG. 3 shows the luminescence glow curves of the thermoluminescent dosimeters of Example 1, subjected to different annealing processes. First, the glow curve structure of a sample subjected to annealing at 260° C. for 10 minutes showed relatively high peaks in a high-temperature range. On the other hand, in the case of a sample subjected to annealing at 300° C. for 10 minutes, the intensity of high-temperature peaks was markedly decreased, but the sensitivity of the main peak was also greatly decreased.

In comparison with these samples, the glow curve structure of a sample subjected to a dual-step annealing process, that is, a process comprising annealing the sample at 300° C. for 10 minutes, rapidly cooling the sample to room temperature, annealing the cooled sample at 260° C. for 10 minutes, and then rapidly cooling the sample to room temperature, showed a remarkable increase in the intensity of the main peak, and also a remarkable decrease in the intensity of high-temperature peaks.

Referring to FIG. 3, in the case when the sample was subjected to the first-step annealing at 300° C., the curves of all of the luminescence peaks (1-5) were severely deteriorated, but in the case where the sample was further subjected to the second-step annealing at 260° C., the peaks 1, 2, 3 and 4 were recovered by the annealing, and the high-temperature peak was not recovered.

In view of dosimetric characteristics, the intensity of the main peak (4) indicates sensitivity to radiation, and the intensity of the high-temperature peak (5) is the main cause of the residual signal. Therefore, it could be seen that the second-step annealing is a very effective way of increasing the sensitivity of the LiF:Mg,Cu,Si thermoluminescent dosimeter, and, at the same time, significantly reducing the intensity of high-temperature peaks to reduce the residual signal.

4. Dose-Response

Figure 4:
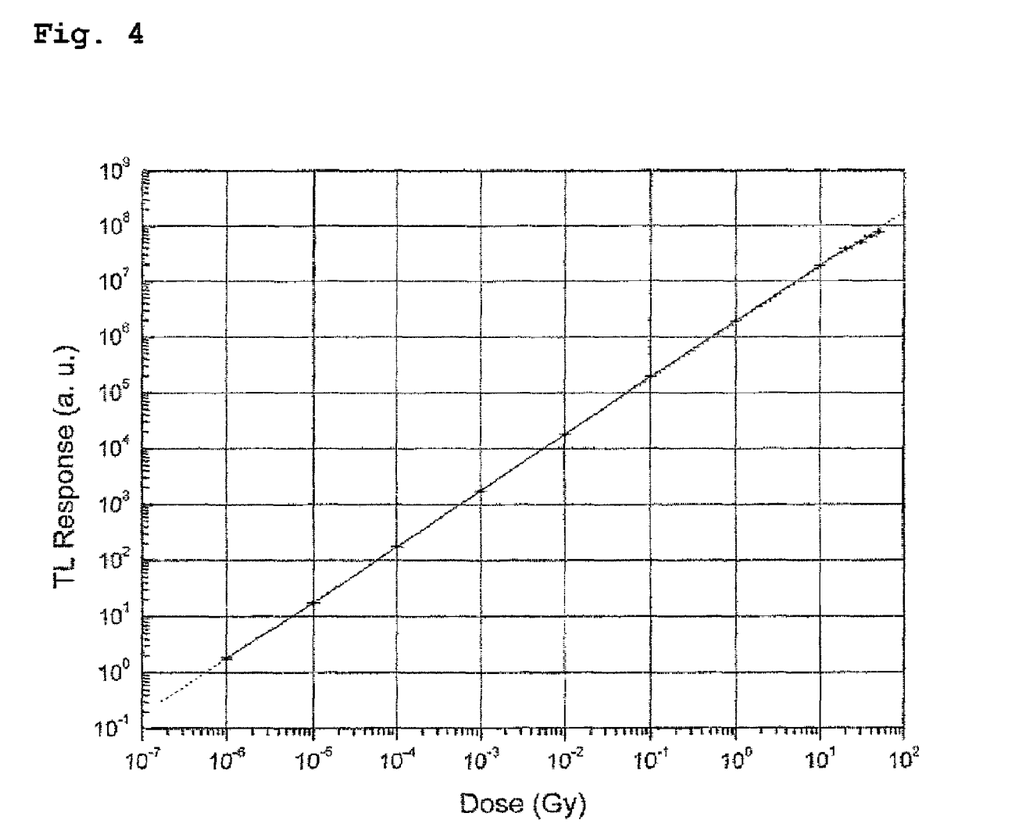
FIG. 4 is a graphic diagram showing the dose response (thermoluminescent response according to absorbed dose) of a thermoluminescent dosimeter according to Example of the present invention.

FIG. 4 shows the dose-response of the thermoluminescent dosimeter of Example 1 in 1 μGy-50 Gy of Cs-137 gamma rays.

As can be seen from FIG. 4, although most of the prior radiation monitors show a tendency to deviate from linearity in a range below $10^{-5}$ Gy, the absorbed dose of the thermoluminescent dosimeter according to Example 1 showed linearity below 20 Gy, and a dose of less than 1 μGy can be measured according to that linearity. This indicates that the thermoluminescent material of the present invention can be used as an ideal radiation dosimeter not only to measure therapeutic radiation doses in the Gy range, but also for environmental radiation monitoring and personal radiation monitoring even for small doses in the μGy range.

As described above, the present invention overcomes two major disadvantages of the prior LiF:Mg,Cu,P thermoluminescent dosimeter, that is, low thermal stability and high residual signal, by fabricating a LiF:Mg,Cu,Si thermoluminescent dosimeter having excellent thermoluminescent characteristics, by substituting dopant P with Si and changing the composition and concentrations of dopants. Thus, it is expected that the LiF:Mg,Cu,P material previously used in the radiation monitoring field can be replaced with the LiF:Mg,Cu,Si material.

As apparent from the foregoing, according to the present invention, the area of peaks in a low-temperature range is smaller than in the prior thermoluminescent dosimeter but the main peak, which is determined to be a single peak having a simple structure, has greater area and intensity. Also, the inventive thermoluminescent dosimeter has high thermal stability and maintains constant thermoluminescence sensitivity even when it is annealed at a high temperature of more than 240 □. Moreover, it has a remarkably low residual signal, and shows excellent dosimetric characteristics, because it can maintain the same sensitivity as its initial readout value, even when it is reused.

What is claimed is:

1. A method for fabricating a thermoluminescent dosimeter for radiation monitoring, wherein the thermoluminescent dosimeter comprises LiF doped with Mg, Cu and Si, and the method comprises the steps of:
   (A) heating a LiF-based thermoluminescent powder material containing a LiF mother material, 0.1-0.5 mol % of an Mg compound, 0.001-0.05 mol % of a Cu compound and 0.5-1.3 mol % of an Si compound to a temperature of 900-1200° C. to melt the LiF-based material;
   (B) cooling the melted material obtained in the step (A) and compression-molding the cooled material;
   (C) sintering the compression-molded material at a temperature of 760-840° C. in an inert gas atmosphere;
   (D) subjecting the sintered material to a first-step annealing process at a temperature of 285-305° C., followed by cooling; and
   (E) subjecting the annealed material obtained in the step (D) to a second-step annealing process at a temperature of 255-265° C., followed by cooling.

2. The method of claim 1, wherein the Mg compound added to LiF is one or more selected from among Mg-containing ionic materials, including magnesium sulfate, magnesium chloride, magnesium fluoride and magnesium oxide.

3. The method of claim 1, wherein the Cu compound added to LiF is one or more selected from among Cu-containing ionic materials, including copper sulfate, copper nitrate, copper oxide and copper chloride.

4. The method of claim 1, wherein the Si compound added to LiF is one or more selected from among ionic materials, including $SiO_2$ and $SiCl_4$.

5. The method of claim 1, wherein the sintering step is carried out at a temperature of 810-835° C.

6. The method of claim 1, the first-step annealing process is carried out for 5 to 30 minutes.

7. The method of claim 1, the second-step annealing process is carried out for 5 to 30 minutes.

* * * * *